Oct. 19, 1971 M. DREVARD ET AL 3,613,396
UNIVERSAL JOINT
Filed Feb. 25, 1970 2 Sheets-Sheet 1

3,613,396
UNIVERSAL JOINT

Michel Drevard, Montbeliard, Charles Mognetti, Seloncourt, and Andre Vermot, Etupes, France, assignors to Automobiles Peugeot, Paris, and Regie Nationale des Usines Renault, Billancourt, France
Filed Feb. 25, 1970, Ser. No. 14,145
Claims priority, application France, Feb. 26, 1969, 6904894; June 26, 1969, 6921443
Int. Cl. F16d 3/30
U.S. Cl. 64—21                                    11 Claims

ABSTRACT OF THE DISCLOSURE

At least one resiliently-yieldable means is interposed between each spherical roller and the first drive element of a universal joint comprising the latter, which carries three trunnions, and a second drive element having three radial pairs of recesses in which the spherical rollers mounted on the trunnions are slidably and rotatably engaged.

---

The present invention relates to universal joints and in particular to homokinetic universal joints of the tripped or three-trunnion type some embodiments of which are described in French Pat. 1,272,530.

Joints of this type for transmitting a movement of rotation between a driving shaft and a driven shaft comprise: a tripod-shaped first drive element connected to one of the two shafts to be coupled and comprising three trunnions whose axes are in planes preferably evenly angularly spaced about the axis of said element and preferably passing through said axis; a second drive element connected to the other of said shafts and comprising three pairs of recesses preferably angularly spaced apart 120° from each other and having a circular or roughly circular section, each facing pair of recesses constituting a rolling way and slideway; and three intermediate elements interconnecting the two drive elements and each comprising a spherical or roughly spherical roller, each intermediate element being rotatable and slidable on one of the trunnions of the first drive element and being trapped between a corresponding pair of said recesses of the second drive element.

The outer spherical or roughly spherical face of each roller must come in contact with the adjacent recesses, but as it is necessary to provide a clearance between the rollers and the recesses, angular play in the joint results which must be taken up when applying the driving torque or when reversing the torque. Taking up the play produces noise which may be disturbing in certain applications, as automobile transmissions.

The object of the present invention is to remedy this drawback in a simple way with not marked increase in the cost of the joint.

The invention provides a universal joint of the aforementioned type wherein at least one resiliently-yieldable means is interposed between each intermediate element and the first drive element, said means biasing each intermediate element in such manner as to maintain it in permanent contact with the recesses between which it is engaged.

According to one embodiment, the resiliently-yieldable means comprises a ring of elastomer or like material compressed between each intermediate element and the first drive element.

Although very simple from the point of view of technical realisation, this improved arrangement affords a substantial improvement in the conditions of utilisation of universal joints of this type and prolongs their life owing to the avoidance of shocks between the component parts.

Further features and advantages of the invention will be apparent from the ensuing description with reference to the accompanying drawings.

Figure 1:
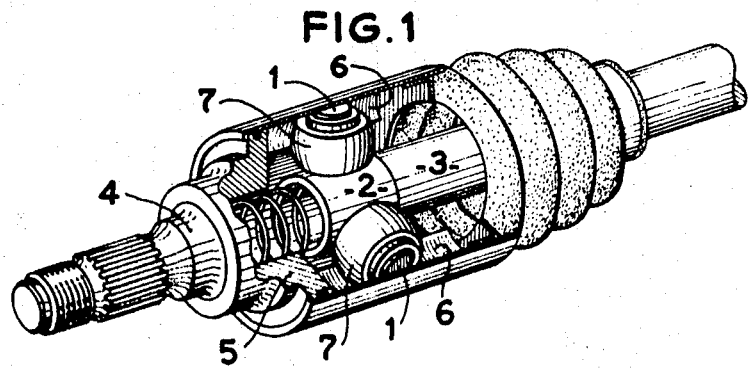
FIG. 1 is a perspective assembly view, partly in section, of a homokinetic universal joint to which the invention is applied.
Figure 2:
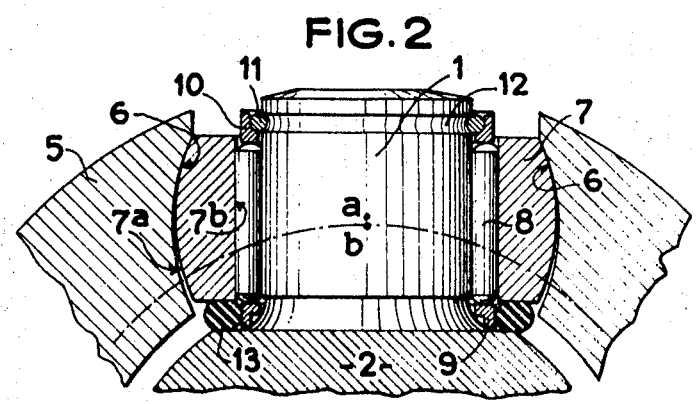
FIG. 2 is a detail sectional view of one example of the mounting of the rollers according to the invention.
Figure 3:
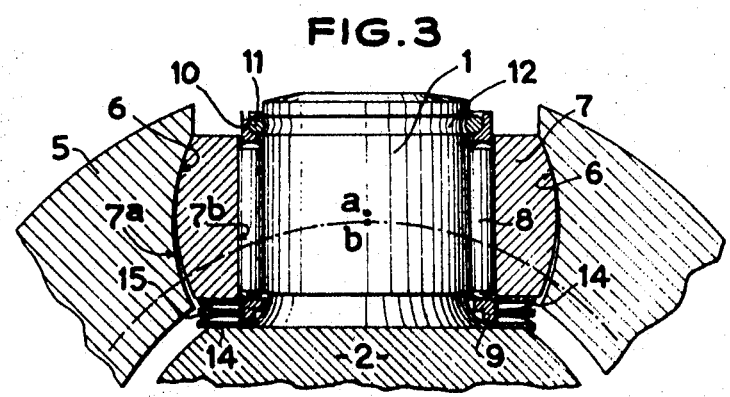
FIG. 3 is a view similar to FIG. 2 of a modification.

In the embodiment shown in FIG. 1, the invention is shown applied to a universal joint in which three trunnions 1 are arranged at right angles to the axis of a hub 2 which constitutes a first drive element and is integral with a shaft 3, which is one of the shafts to be coupled. A second drive element, which is integral with a second shaft 4 to be coupled to the shaft 3, comprises a member 5 in the form of a cylindrical cup in the walls of which extend parallel to the axis of the cup three pairs of recesses 6 which define cavities receiving intermediate elements carried by the trunnions 1 and constituted by rollers having a roughly spherical outer face 7a (FIGS. 2 and 3).

The rollers have a bore or aperture 7b and needles 8 are interposed between the rollers 7 and the trunnions 1, these needles being axially retained by rings 9 and 10. The ring 9 bears on the hub 2 whereas the ring 10 is retained by a stop ring 11 engaged in a groove 12 in the trunnion 1.

It is known that during the operation of the joint and consequent to angular deviation between the axes of the shafts 3 and 4, the rollers 7 move along the recesses 6 and this produces a rotating and sliding movement against the needles 8. To ensure correct operation of the joint it is therefore necessary to provide a slight clearance or play between the outer face 7a of the rollers 7 and the recesses 6, that is, the outside diameter of the roller must be slightly less than the inside diameter of the facing recesses.

Further, a the rollers 7 slide along the trunnion 1, it is necessary that the rings 9, 10 have an outside diameter less than the diameter of the bores 7b of the rollers.

According to the invention, resiliently-yieldable means 13 are interposed between the hub 2 and each roller 7, said means comprising, in the embodiment shown in FIG. 2, a grease-resistant toric ring of elastomer. The ring 13 is compressed between the hub and the roller so that the latter is biased outwardly and, in the absence of transmitted torque, it is in contact with the two facing recesses 6. Thus the arrangement shown in FIG. 2 is obtained in which the centre $a$ of the spherical face 7a of the roller is slightly offset relative to the centre of symmetry $b$ of the recesses.

The rate of crushing of the resiliently-yieldable ring 13 must be such that the ring performs its function even when the roller 7 occupies on its trunnion the position the most remote from the hub, irrespective of the angle between the shafts 3 and 4.

When torque is transmitted, no shock can occur between the roller 7 and the recesses 6 since there is already prior contact. When the torque increases, the rollers automatically center themselves in the recesses by compressing the ring 13 so that the contacting bearing faces are maximum. This is achieved when the centre $a$ of each roller coincides with the centre of symmetry b of the corresponding pair of facing recesses.

When the torque applied is reversed and passes through a zero value, the rollers 7 biased by the resiliently-yieldable means 13 once again pass through their initial position of rest before acting on the opposite recess so that, here again, no shock can occur.

In the modification shown in FIG. 3, the resiliently-yieldable means comprises two corrugated washers 14 separated by a flat washer 15, the operation thereof being identical to that described with respect to the first embodiment.

Generally, the invention is not limited to the embodiments shown and described which have been given only by way of examples.

In particular, the resiliently-yieldable means can be constructed in any other way, in particular in the form of Belleville washers which may be if desired notched so as to impart improved flexibility thereto.

Similarly, the arrangement according to the invention can be employed if no needles are provided between the rollers 10 and the trunnions 1 and irrespective of the arrangement and shape of the trunnions and drive elements, several embodiments of which are described in the aforementioned French Patent No. 1,272,530.

It is moreover known that it is usual in an automobile vehicle transmission to connect the differential to each driving wheel through two universal joints interconnected by a connecting shaft.

In the first universal joint, adjacent the differential, the connecting shaft constitutes the driven element, whereas in the second universal joint, adjacent the wheel, it constitutes the driving element. In each joint the connecting shaft is connected by splines to the hub which constitutes the first drive element and carries the three trunnions on which the rollers or other intermediate elements are mounted.

As the connecting shaft is connected by splines to the hub of each universal joint, it is conventional in such an arrangement having two universal joints, to maintain at least one of the ends of the connecting shaft supported against the end of the drive element carrying the three pairs of recesses of one of the universal joints by means of a return spring interposed between the other end of the connecting shaft and the end wall of the drive element carrying the three pairs of recesses of the other universal joint. Now, it has been found that disposing, in accordance with the invention, a resiliently-yieldable means between each roller or intermediate element and the adjacent hub which biases the rollers outwardly against the recesses, has for effect to increase, owing to the effect of the assembly tolerances and in certain conditions of utilisation, the forces which tend to cause the connecting shaft to slide. This increase can be such that these forces exerted on the connecting shaft reach a value higher than the force exerted by the return spring. Consequently, there is a series of axial movements of the shaft manifested by a series of slight shocks or blows between the end thereof opposed to the spring and the end wall of the adjacent drive element and a disturbing perceptible rumbling in the body of the vehicle. This phenomenon occurs for example when the vehicle turns rapidly or when the torque transmitted is low.

There will now be described, with reference to FIG. 4, an arrangement whereby it is possible to avoid this phenomenon which, although it does not substantially affect the efficiency of the transmission, unfortunately increases the noise level inside the vehicle.

Figure 4:
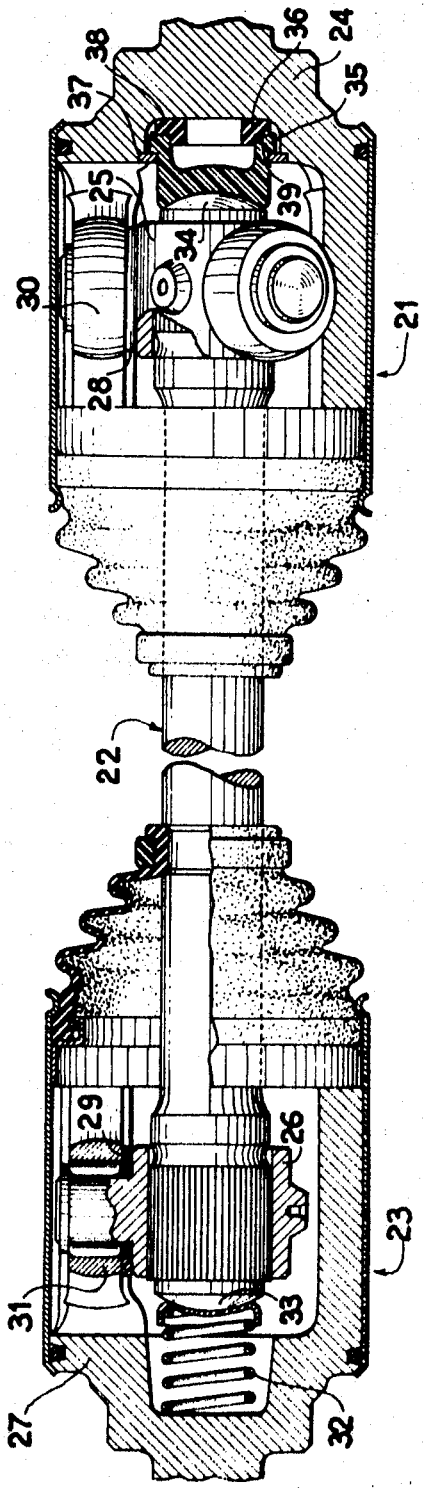
FIG. 4 is an elevational view, with parts cut away, of a part of an automobile transmission comprising two universal joints according to the invention interconnected by a connecting shaft.

FIG. 4 shows a part of an automobile transmission between a differential and a driving wheel (not shown). This transmission comprises a first universal joint 21 of the tripod or three-trunnion type, connected by a connecting shaft 22 to a second universal joint 23. The joint 21 comprises a first drive element 24 connected to the output shaft of the differential and a second drive element constituted by a hub 25 connected by splines to the connecting shaft 22. Similarly, in the second universal joint, a splined hub 26 is mounted on the shaft 22 whereas a drive element 27 is connected to the driving wheel of the vehicle.

In both these universal joints, the resiliently-yieldable means 28, 29 are interposed between the hubs 25 and 26 and the rollers 30, 31 respectively in accordance with the arrangement described with reference to FIGS. 1–3.

A coil spring 32 is interposed between the end wall of the drive element 37 of the joint 33 and the end 33 of the shaft 22, the other end 34 of the latter bearing against an abutment or thrust member 35 of polyamide or like material located in the end wall of the drive element 24 of the joint 21. The abutment 35 is cup-shaped and retained in a cavity 36 in the end wall of the element 24 by a flat washer 37 which is riveted or otherwise secured to the edge of the cavity 36. A ring 38 of resiliently-yieldable material is interposed between the abutment 35 and the end wall of the element 24. This ring has in the selected embodiment an L-shaped cross section and has a recess 39 in which the edge of the abutment 35 is adapted. This ring is advantageously made from microcellular polyurethane whose density is selected as a function of the desired damping effect.

The ring 38 is preferably mounted so as to be pre-compressed at a rate compensating the return force of the spring 32 in the position of rest of the connecting shaft 22. This pre-stressed condition of the ring 38 is achieved when the abutment 35 is mounted in and riveted to the edge of the cavity 36.

Owing to the device provided at the end 34 of the connecting shaft connecting the two universal joints, the slight shocks which occur between this end of the shaft 22 and the abutment 35 in the aforementioned certain conditions of utilisation and under the effect of excessive forces applied longitudinally of the connecting shaft, are absorbed by the resiliently-yieldable ring 38 and are no longer transmitted to the assembly of the transmission mechanism. The disturbing noise produced by the shocks is therefore completely eliminated.

It will be understood that the resiliently-yieldable damping means interposed between the end wall of the housing 36 and the abutment 35 could have any appropriate form other than that described and represented, it depending in particular on the form of the abutment or on the type of material from which it is made.

Although specific embodiments of the invention have been described, many modifications and changes may be made therein without departing from the scope of the invention.

Having now described our invention, what we claim and desire to secure by Letters Patent is:

1. A universal joint for coupling two shafts comprising a first drive element connected to one of the two shafts and comprising an axis of rotation and three trunnions having axes contained in planes angularly spaced around said axis; a second drive element connected to the other of said shafts and comprising means defining three pairs of recesses having a substantially part-circular cross-sectional shape, each pair of recesses being in facing relation to one another and constituting a rolling way and slideway; and three intermediate elements interconnecting the two drive elements and each comprising a substantially spherical roller, each intermediate element being rotatable and slidable on one of said trunnions and being trapped between a corresponding pair of said recesses of the second drive element; a toric ring of grease-resistant resiliently-yieldable material being interposed between each intermediate element and the first drive element, said means biasing each intermediate element in such manner as to maintain it in permanent contact with the recesses between which it is engaged.

2. A universal joint for coupling two shafts comprising a first drive element connected to one of the two shafts and comprising an axis of rotation and three trunnions having axes contained in planes angularly spaced around said axis; a second drive element connected to the other of said shafts and comprising means defining three pairs of recesses having a substantially part-circular cross-sectional shape, each pair of recesses being in facing relation to one another and constituting a rolling way and slideway; and three intermediate elements interconnecting the two drive elements and each comprising a substantially spherical roller, each intermediate element being rotatable and slideable on one of said trunnions and being trapped between a corresponding pair of said recesses of the second drive element; a resiliently-yieldable metallic washer being interposed between each intermediate element and the first drive element, said washer biasing each intermediate element in such manner as to maintain it in permanent contact with the recesses between which it is engaged.

3. A universal joint as claimed in claim 2, comprising two resiliently-yieldable metallic washers and a flat washer interposed between said two metallic washers.

4. A universal joint as claimed in claim 2, wherein said washer is corrugated.

5. A universal joint as claimed in claim 2, wherein said washer is a Belleville washer.

6. A universal joint for coupling two shafts comprising a first drive element connected to one of the two shafts and comprising an axis of rotation and three trunnions having axes contained in planes angularly spaced around said axis; a second drive element connected to the other of said shafts and comprising means defining three pairs of recesses having a substantially part-circular cross-sectional shape, each pair of recesses being in facing relation to one another and constituting a rolling way and slideway; and three intermediate elements interconnecting the two drive elements and each comprising a substantially spherical roller, each intermediate element being rotatable and slidable on one of said trunnions and being trapped between a corresponding pair of said recesses of the second drive element; at least one resiliently-yieldable means being interposed between each intermediate element and the first drive element, said resiliently-yieldable means biasing each intermediate element in such manner as to maintain it in permanent contact with the recesses between which it is engaged, said first drive element being a hub comprising splines connecting it to said one of said shafts, the joint further comprising second resiliently-yieldable means biasing said one of said shafts in a direction parallel to the direction of said splines and towards the second drive element, and a resiliently-yieldable damping means interposed between said second drive element and an adjacent end of said one of said shafts.

7. A universal joint as claimed in claim 6, wherein said adjacent end is in bearing relation against an abutment fixed to the second drive element, said resiliently-yieldable damping means being placed between said abutment and an end wall of a cavity in the second drive element.

8. A universal joint as claimed in claim 7, wherein the abutment has a cup shape and the resiliently-yieldable damping means comprises a recess in which an edge of said cup-shaped abutment is engaged.

9. A universal joint as claimed in claim 6, wherein the resiliently-yieldable damping means is in a precompressed condition so as to exert on said adjacent end a force which substantially corresponds to a biasing force exerted on said one of said shafts at rest by the second resiliently-yieldable means.

10. A universal joint as claimed in claim 9, wherein said precompressed condition is achieved by compressing the resiliently-yieldable damping means between the abutment and the second drive element when the abutment is secured to the second drive element.

11. A universal joint as claimed in claim 6, wherein said resiliently-yieldable damping means is an L-section ring of microcellular polyurethane material.

References Cited

UNITED STATES PATENTS 3,120,746    2/1964    Kayser _____ 64—21

FOREIGN PATENTS 1,272,530    8/1961    France _____ 64—21

EDWARD G. FAVORS, Primary Examiner